3,639,447
ALKYL DIESTERS OF 3,5-DIALKYL-4-HYDROXY-
PHENYLALKANOIC ACID
George Wright Taylor and Derek Harold Wood, Harrogate, England, assignors to Imperial Chemical Industries Limited, London, England
No Drawing. Original application Mar. 28, 1966, Ser. No. 537,690, now Patent No. 3,422,059, dated Jan. 14, 1969. Divided and this application Mar. 7, 1968, Ser. No. 736,865
Claims priority, application Great Britain, May 3, 1965, 18,516/65
Int. Cl. C07c 69/76
U.S. Cl. 260—473 R                     4 Claims

ABSTRACT OF THE DISCLOSURE

Phenolic esters having antioxidant properties are disclosed. The esters are diol dialkanoates. Typical examples are decamethylene diol di-[bis-(3,5-di-tert-butyl-4-hydroxyphenyl) acetate], and hexamethylene diol di-[bis-(3,5-di-tert-butyl-4-hydroxyphenyl) acetate].

---

This application is a division of copending U.S. application Ser. No. 537,690, filed Mar. 28, 1966 and now issued as U.S. Pat. 3,422,059.

This invention relates to stabilised polyolefines, in particular to polyolefine compositions which, in the form of shaped articles, retain their stability after many laundry treatments.

It is well known that polyolefines, in particular those containing tertiary carbon atoms, are subject to degradation by several influences, as for example ultra-violet light, heat and oxygen. Many attempts have been made to stabilise the polyolefine material against these degradative influences with varying degrees of success. Unfortunately some of the most effective stabilising agents are unsatisfactory as stabilisers for polyolefines in the form of shaped articles, as for example, filaments and fibres which are subect to solvent and washing treatments as in dry cleaning and laundering, for the stabilising effect is rapidly lost by extraction of the stabiliser or stabilisers from the articles.

We have now found that certain diol dialkanoates are very effective antioxidants in polyolefine articles and that such articles are highly resistant to, for example, laundering.

According to the invention we provide a stabilised polyolefine composition wherein there is incorporated either alone or in combination with other polyolefine stabilisers an antioxidant which is a diol dialkanoate of the formula

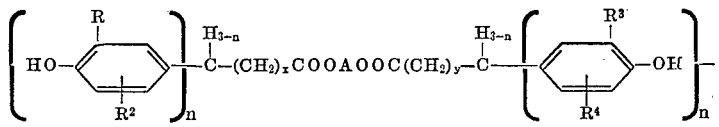

where $R^1$, $R^2$, $R^3$ and $R^4$ are hydrogen, alkyl, or alkoxyl groups, $n$ is 2 or 3, $x$ and $y$ have the value 0, 1, 2 or 3 and A is derived from a diol said diol being an alkane diol, a thiodialkanol or a poly(ethylene glycol).

Diol dialkanoates according to the invention may be conveniently prepared by ester interchange between the relatively high boiling diol and a lower alkyl ester, as for example, the methyl ester of the appropriate phonolic acid. The ester interchange reaction may be facilitated by the use of an appropriate catalyst, as for example, zinc or calcium acetate or a tetraalkyl titanate. This method may be used to prepare diol dialkanoates having different phenolic groups at the two ends of the dialkanoate molecules by carrying out the ester interchange between the diol and a mixture of lower alkyl esters of different phenolic acids. In this case a mixture of products would be formed including diesters having different phenolic groups at the ends of the molecule. Such mixtures may be used to stabilize polyolefines without separation of the individual diesters therein.

Preferred diols from which esters according to the invention are derived are those which contain at least 3 carbon atoms or at least two ethylenoxy groups.

Phenolic diesters wherein a single phenolic group is present in the carboxylic acid from which they are derived are known but these in general exhibit a lesser stabilising effect, particularly on repeated laundering, than the esters of the present invention. It is preferred that at least one substituent alkyl or alkoxy group (any one or more of the $R^1$, $R^2$, $R^3$ and $R^4$ groups) should be present in the phenolic nuclei ortho to the phenolic hydroxyl group, for in this way, particularly if this substituent group is a bulky one, the antioxidant effectiveness of the phenolic portion of the diester is enhanced due to steric hinderance of the phenolic hydroxyl group. Compounds according to the invention wherein the phenolic groups each have two bulky substituents, as for example tertiary butyl groups, each in an ortho position with respect to the phenolic hydroxyl group, are very effective stabilising substances.

Diesters according to the invention protect polyolefines into which they are incorporated against oxidative degradation and in general 0.05 to 5% by weight of the polyolefine is an effective amount. As polyolefines are also subject to other degradative effects it is often desirable to incorporate one or more additional stabilising substances, as for example an ultraviolet light absorber or thermal stabiliser.

Diesters according to the invention are incorporated into polyolefines by any method, as for example mixing of the powdered polyolefine with the solution of the additive in a volatile solvent followed by drying and granulation of the mixture or by mixing the additive directly into the softened polyolefine in a hot roll or Banbury mixer.

The present invention may be applied to any polyolefine and we have found it to be most useful for improving the stability of stereoregular polyolofines, particularly those, as for example stereoregular poly(4-methylpentene-1) or isotactic polypropylene, from which useful textile fibres or filaments may be produced.

The examples which follow illustrate the invention and the manner in which it may be performed. In these examples all parts are by weight.

EXAMPLE 1

Preparation of decamethylene diol di[bis(3,5-di-tert.-butyl-4-hydroxyphenyl) acetate]

Methyl di-(3,5-di-tert-butyl-4-hydroxyphenol) acetate (7.2 parts and decamethylene diol (1.3 parts) are heated together under a flow of nitrogen gas. When the mixture becomes molten tetra-n-butyl titanate solution in n-butanol (1 part in 4 parts of butanol) is added as catalyst for the ester interchange reaction. The mixture is then heated to 160°–170° C. for seven hours, cooled and the solid product, decamethylene diol di[bis-(3,5-di-tert-butyl-4-hydroxyphenyl) acetate], after recrystallisation from petroleum ether (boiling range 40–60° C.) has a melting point of 172–178° C. The yield of product is 77% of the theoretical amount.

Effectiveness of stabilisation.—The diester (0.5 part) prepared as above is incorporated into polypropylene (100 parts) together with a thermal stabiliser, dilauryl-β,β¹-thiodipropionate (0.5 part) and the mixture is melt spun and drawn into filamentary yarn of 720 denier having 144 filaments and 4 turns per inch of twist inserted therein. Hanks of the yarn together with similar yarn containing a commercial antioxidant (the condensation product from 3-methyl-6-tert-butylphenol and crotonaldehyde) in place of the foregoing antioxidant are subjected to repeated cycles of a laundering process, which consists in agitating the hanks in boiling soap solution (5 parts of textile soap and 2 parts of sodium carbonate in 1000 parts of water) for 1 hour following by rinsing in fresh water and drying at 140° C. for one hour in a Wallace ageing oven (H. W. Wallace Co., Croydon, England) until the hank of least partially breaks when subjected to a vigorous tug with the fingers.

Yarn stabilised with antioxidant prepared as described above survives 23 laundering cycles whereas that containing the commercial antioxidant survives only 8–9 cycles.

In an even more severe laundering process, wherein the hanks are boiled in the soap solution for 30 minutes and dried in a Wallace oven at 150° C. for 1 hour, stabilised with the foregoing antioxidant according to the invention survives 17 laundering cycles and the control yarn containing the commercial antioxidant survives 6 cycles.

EXAMPLE 2

Preparation of hexamethylene diol di-[bis-(3,5-di-tert-butyl-4-hydroxyphenyl) acetate]

Methyl di-(3,5-di-tert-butyl-4-hydroxyphenyl) acetate (14.5 parts) and hexamethylene diol (1.8 parts) are heated together under a flow of nitrogen gas at 160–170° C. for about 16 hrs. and a trace of tetra-n-butyl titanate is then added as a catalyst and the mixture heated at 170° 180° C. for a further 23 hours. The mixture is cooled and the solid product hexamethylene diol di-[bis-(3,5-di-tert-butyl-4-hydroxy - phenyl) acetate] after recrystallisation from petroleum ether (boiling range 100–120°) has a melting point of 173–181° C. The yield of product is 80% of the theoretical amount.

When this diester (0.5 part) is incorporated into isotactic polypropylene (100 parts) together with dilauryl-β,β-thiodipropionate (0.5 part) and spun into yarn as described in Example 1, the resultant yarn survives 15 cycles of laundering according to the more severe laundering process (drying at 150° C.) of Example 1.

EXAMPLE 3

Preparation of decamethylene diol di-[4,4-bis-(2-methyl-4-hydroxy-5-tert-butylphenyl) butanoate]

Ethyl 4,4-bis(2-methyl-4-hydroxy-(5-tert-butylphenyl) butanoate (8.8 parts) and decamethylene diol (1.7 parts) are heated together under a flow of nitrogen gas at 170° C. for about 16 hours and a trace of tetra-n-butyl titanate is added as a catalyst and the mixture heated at 170° C. for a further 8 hours. The mixture is cooled and the solid product decamethylene diol di[4,4-bis-2-methyl-4-hydroxy-5-tertbutylphenyl) butanoate] after recrystallisation from petroleum ether has a melting point of 120–124° C. The yield of product is 76% of the theoretical amount.

When this diester (0.5 part) is incorporated into isotactic polypropylene (100 parts) together with dilauryl-β,β'-thiodipropionate (0.5 part) and spun into yarn as described in Example 1, the resultant yarn survives 12 cycles (drying temp. 150° C.) of the severe laundering process.

EXAMPLE 4

Preparation of 4,4'-thiodibutanol di-[bis-(3,5-di-tert-butyl-4-hydroxyphenyl) acetate]

Methyl di-(3,5-di-tert-butyl-4-hydroxyphenol) acetate (7.2 parts) and 4,4'-thiodibutanol (1.3 parts) are heated together under a flow of nitrogen gas. When the mixture becomes molten a trace of tetra-n-butyl titanate solution in n-butanol (1 part in 4 parts of butanol) is added as catalyst for the ester interchange reaction. The mixture is then heated to 180–200° C. for 2½ hours, cooled and the solid product 4,4'-thiodibutanol di[bis(3,5-di-tert-butyl-4-hydroxyphenyl) acetate] is washed with petroleum ether (boiling range 40–60° C.) to yield a product melting at 69–76° C. The yield of product is 55% of the theoretical amount.

When this diester (0.5 part) is incorporated into isotactic polypropylene (100 parts) together with dilauryl-β,β'-thiodipropionate (0.5 part) and spun into yarn as described in Example 1, the resultant yarn survives 12 cycles (drying temp. 150° C.) of the severe laundering process.

As one skilled in the art may judge from the foregoing examples diesters according to the invention are effective antioxidants for polyolefines and incorporated therein are very resistant to severe laundering and drying treatments. Simpler esters wherein only a single phenolic group is present at the ends of the diester molecule, as for example the following compounds:

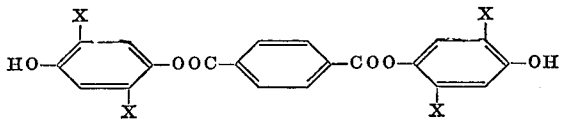

and

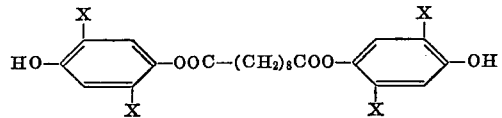

wherein X is a tert-butyl group, survive only 3–6 cycles of the severe (drying at 150° C.) laundering process.

What we claim is:

1. A phenolic ester having antioxidant properties, said ester being a diol dialkanoate of the formula:

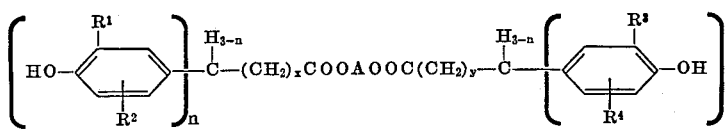

where $R^1$, $R^2$, $R^3$ and $R^4$ are selected from the group consisting of hydrogen and lower alkyl, $n$ is selected from the group consisting of 2 and 3, $x$ and $y$ have a value selected from the group consisting of 0, 1, 2 and 3 and A is derived from a diol selected from the group consisting of alkane diols having 3–10 carbon atoms and monothiodialkanols.

2. A phenolic ester according to claim 1 wherein the phenolic hydroxyl groups are sterically hindered.

3. A phenolic ester according to claim 2 wherein the phenolic hydroxy groups are sterically hindered by two tertiary butyl groups.

4. A phenolic ester according to claim 1 selected from the group consisting of:
   (a) decamethylene diol di-[bis-(3,5-di-tert-butyl-4-hydroxyphenyl) acetate],
   (b) hexamethylene diol di-[bis-(3,5-di-tert-butyl-4-hydroxyphenyl) acetate],
   (c) decamethylene diol di-[4,4 - bis - (2-methyl-4-hydroxy-5-tert-butyl phenyl) butanoate], and
   (d) 4,4' - thiodibutanol di-[bis-(3,5-di-tert-butyl-4-hydroxyphenyl) acetate].

References Cited
UNITED STATES PATENTS

| | | | |
|---|---|---|---|
| 3,497,549 | 2/1970 | Dexter et al. | 260—473 |
| 3,247,240 | 4/1966 | Meier et al. | 260—473 |
| 3,277,148 | 10/1966 | Steinberg | 260—470 |

LORRAINE A. WEINBERGER, Primary Examiner

J. F. TERAPANE, Assistant Examiner

U.S. Cl. X.R.

260—45.85